United States Patent
Smith, Jr. et al.

(10) Patent No.: US 6,508,480 B2
(45) Date of Patent: Jan. 21, 2003

(54) VEHICLE STEERING DAMPING SYSTEM WITH MAGNETOSTRICTIVE ELEMENT

(75) Inventors: Ronald G. Smith, Jr., New Carlisle, OH (US); Michael L. Oliver, Xenia, OH (US); William C. Kruckemeyer, Beavercreek, OH (US); Troy A. Miller, Xenia, OH (US)

(73) Assignee: Delphi Technologies, Inc., Troy, MI (US)

(*) Notice: Subject to any disclaimer, the term of this patent is extended or adjusted under 35 U.S.C. 154(b) by 42 days.

(21) Appl. No.: 09/865,938

(22) Filed: May 25, 2001

(65) Prior Publication Data

US 2002/0175017 A1 Nov. 28, 2002

(51) Int. Cl.[7] .............................. B62D 7/22; F16F 15/03
(52) U.S. Cl. ......................... 280/89; 180/400; 180/422; 188/267
(58) Field of Search .................. 280/771, 89, 89.1, 280/93.514; 180/400, 421, 422, 446; 188/267, 267.2

(56) References Cited

U.S. PATENT DOCUMENTS

| | | | | |
|---|---|---|---|---|
| 4,200,003 A | * | 4/1980 | Miller | 188/267.2 |
| 4,352,304 A | * | 10/1982 | Warner | 280/90 |
| 4,811,807 A | * | 3/1989 | Schier | 180/421 |
| 2001/0054527 A1 | * | 12/2001 | Card | 188/267.1 |

FOREIGN PATENT DOCUMENTS

GB      2 343 494      * 5/2000

OTHER PUBLICATIONS

Research Disclosure No. 333099, "Electro–Rheological Torsional Damper for an Automobile Steering System", Jan. 10, 1992, Anonymous Author.*

* cited by examiner

Primary Examiner—Peter C. English
(74) Attorney, Agent, or Firm—Scott A. McBain

(57) ABSTRACT

A vehicle steering system includes a steering wheel and a steering shaft coupled between the steering wheel and wheels of the vehicle. The shaft is operable for rotating when the steering wheel is turned to thereby turn the vehicle wheels. A vibration damping system for absorbing vibrations in the steering wheel and shaft includes a rotor coupled to the steering shaft to rotate with the shaft and a case surrounding the rotor and a clutch surface proximate the rotor. A magnetic circuit generates a magnetic flux in the rotor. The rotor is operable to engage the clutch surface and thereby vibrationally couple the steering shaft to the case to absorb vibrations in the shaft, and when a magnetic flux is generated therein, to disengage the clutch surface so that the steering shaft may more freely rotate.

29 Claims, 2 Drawing Sheets

VEHICLE STEERING DAMPING SYSTEM WITH MAGNETOSTRICTIVE ELEMENT

FIELD OF THE INVENTION

This invention relates to power steering systems for automotive vehicles and, more particularly, to a damping system for a rack and pinion power steering system in an automotive vehicle.

BACKGROUND OF THE INVENTION

Steering systems on vehicles equipped with a rack and pinion-type steering frequently experience high speed steering wheel shake. Such high speed shake of the steering wheel is detrimental to the feel of the steering to the driver of the vehicle. Prior attempts to reduce or eliminate such high speed shake or vibrations have proven unsuccessful. More particularly, the conventional means of attenuating high speed shake are ineffective on vehicles with rack and pinion-type steering systems. The primary reasons that earlier attempts to reduce or eliminate high speed shake and vibrations of this type have not been effective for rack and pinion-type steering systems are due to the mounting and frequency requirements for such systems.

Previously, linear dampers have been used to dampen steering wheel oscillations or vibrations. Linear dampers are commonly effective on larger vehicles, which have large displacement steering systems, because the linear damper devices focus on the steering system velocity. Rack and pinion-type steering systems typically have a high frequency and yet low amplitude vibration or shake, and linear dampers are not adequately suited to address vibrations of this type. The low amplitude vibration does not provide sufficient velocity for the linear damper to operate effectively.

Other devices which have been used to address high speed steering wheel shake include constant friction-type interfaces. However, such devices have also proven to be unacceptable for rack and pinion-type steering systems because the feel and the return-to-center characteristics of the steering system are detrimentally impacted or destroyed with constant friction-type interfaces.

Therefore, a need exists for a damping system for high speed shake and vibrations of high frequency and low amplitude in rack and pinion-type steering systems while still providing good responsive feeling to the steering wheel and return-to-center characteristics.

SUMMARY OF THE INVENTION

This invention addresses the above-described objectives and other objectives associated with vehicle rack and pinion-type steering systems. Specifically, the invention reduces high speed shake by transferring the energy of the motion to a stationary member, such as a rack and pinion housing, a frame, or other solid member associated with the automotive vehicle or steering system. To that end, the present invention links the steering system to the solid, stationary member when the steering wheel is not being turned.

In one embodiment of the invention, the vehicle steering system comprises a steering wheel and a steering shaft which is coupled between the steering wheel and wheels of the vehicle to turn the vehicle wheels when the steering wheel is turned. The vibration damping system which absorbs vibrations in the steering wheel and steering shaft comprises a rotor which is coupled to the steering shaft to rotate with the shaft when the steering wheel is turned. A rigid case surrounds the rotor and a clutch surface is positioned proximate the rotor. When the steering wheel is not being turned, such as to steer the vehicle, the rotor is operable to engage the clutch surface and thereby vibrationally couple the steering column to the case to absorb vibrations in the column. The case may be coupled to some other solid part of the vehicle for dissipating the vibrations. The rotor is further operable, when a magnetic flux is generated therein, to disengage the clutch surface so that the steering column may more freely rotate for turning the vehicle. A magnetic circuit is utilized for selectively generating a magnetic flux in the rotor when the vehicle is to be steered.

More specifically, the rotor of the vibration damping system is formed of a magnetostrictive material. A coil is wrapped around the rotor and selectively generates a magnetic flux therein. The rigid case is formed of a material for containing the magnetic flux proximate the rotor. The clutch surface is on a non-magnetic stator to be engaged by the rotor. The magnetostrictive material, such as nickel, or a turbium/iron alloy changes shape and dimension. That is, upon application of the magnetic flux within the rotor, the rotor is dimensionally modified. Utilizing a cylindrical rotor, as in one embodiment, the cylindrical diameter of the rotor decreases when the magnetic flux is generated therein and the cylinder increases in length. As such, the rotor disengages the clutch surface which surrounds the rotor. The rotor then returns to a generally non-modified dimensional shape to re-engage the clutch surface when the magnetic flux is no longer generated therein.

In operation, when the steering wheel is not being turned, the vibration damping system isolates the high speed shake energy from the driver by transmitting it through the rigid case which is then mounted to another stationary or rigid member. Upon the need to turn the vehicle, an input from the steering wheel, such as an electrical signal generated by a sensor, may be used as an input to release the rotor, such as by triggering operation of the magnetic circuit. Upon generating a flow of magnetic flux through the magnetostrictive rotor material, the rotor contracts to allow rotation of the steering wheel with little or no unwanted side effects, such as excessive drag, poor return-to-center characteristics, or significantly increased steering effort based upon inertial effects of the vibration damping system. These features and other features of the invention become more readily apparent from the detailed description of the invention below.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE INVENTION

Figure 1:
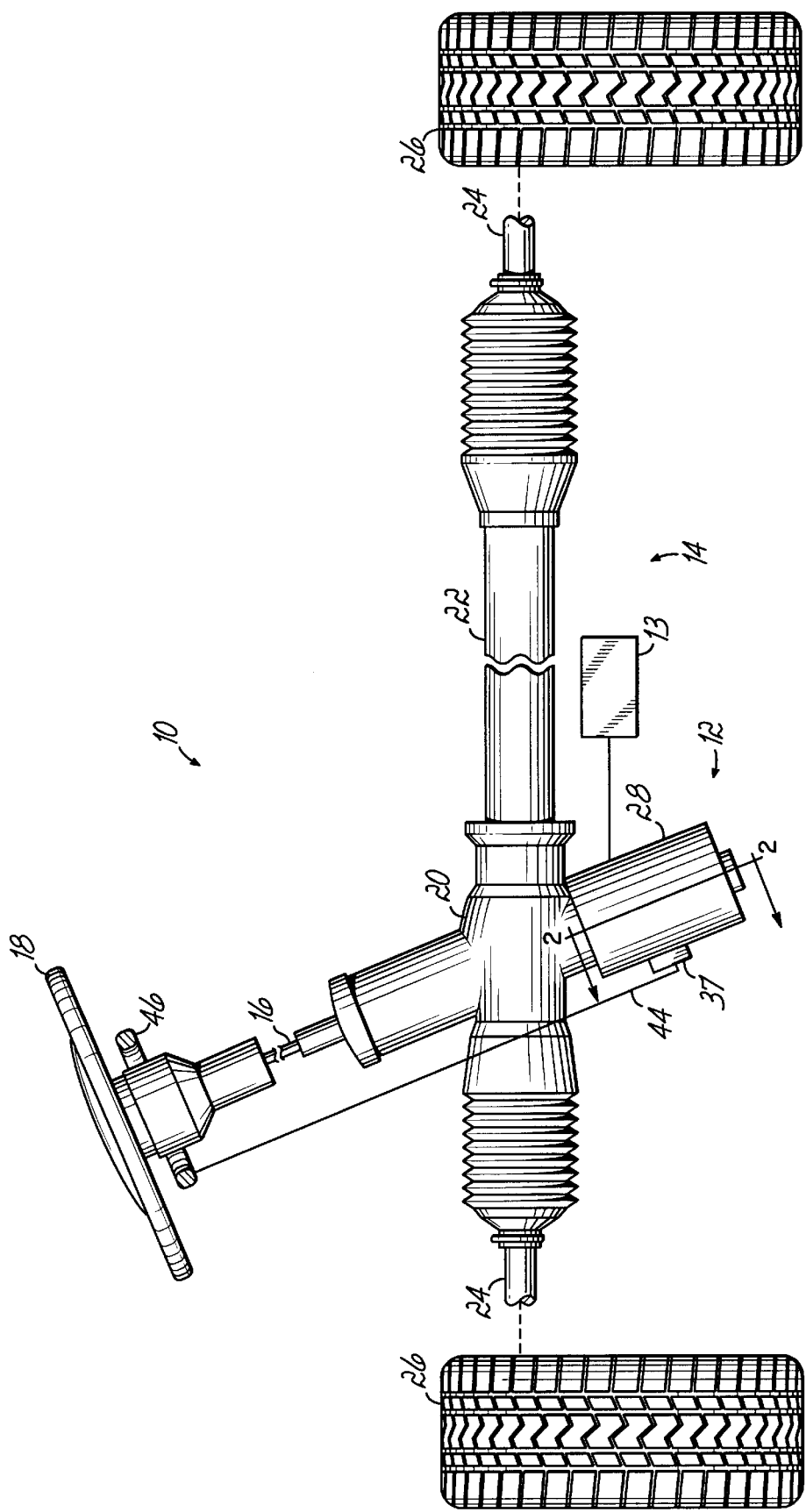
FIG. 1 discloses a perspective view of components of a steering system incorporating the present invention.

FIG. 1 illustrates, in perspective view, a simplistic version of a power steering system 10, and particularly a power steering system which utilizes a rack and pinion-type assembly 14. System 10 includes an input shaft or steering shaft 16 which is coupled to a steering wheel 18 of a vehicle. Details of a standard rack and pinion-type system are well known to those of ordinary skill in the art, and FIG. 1 illustrates only one possible embodiment of such a system. Other embodiments may be utilized in accordance with the principles of the present invention.

The input shaft 16 is coupled to a gear box 20. A rack (not shown), which meshes with a pinion gear (not shown) coupled to shaft 16, is located within the gear box 20 and within a rack shaft and power cylinder portion 22 of the gear box so as to be slidable to left and right positions.

Left and right tie-rods 24, 24 are respectively connected to the ends of the rack shaft (not shown), which is located in the rack shaft and power cylinder portion 22 of gearbox 20. When the pinion gear coupled to shaft 16 of the power steering system 10 meshes with the rack, the tie-rods 24, 24 move integrally in the left or right direction according to the driver input on the steering wheel 18. The turn or rotation of the wheel 18 is transmitted through the input shaft 16 to the steering system 10, and ultimately to wheels 26 coupled to the tie-rods 24, 24.

The damping system 12 of the present invention is coupled to an end of the input shaft 16. In accordance with one aspect of the invention, the case 28 encasing the system 12 may be coupled to another stationary member, such as a rack and pinion housing, frame, or other solid member of the vehicle in which the invention is mounted, to absorb vibrations which are transferred to the vibration damping system 12 through shaft 16. FIG. 1 illustrates the vibration damping system 12 coupled to shaft 16. Case 28, in turn, is coupled to a stationary member 13 (shown schematically), which will absorb the vibration and energy of the high speed shake to prevent it from being transferred through the shaft 16 and steering wheel 18, and ultimately to the driver.

Figure 2:
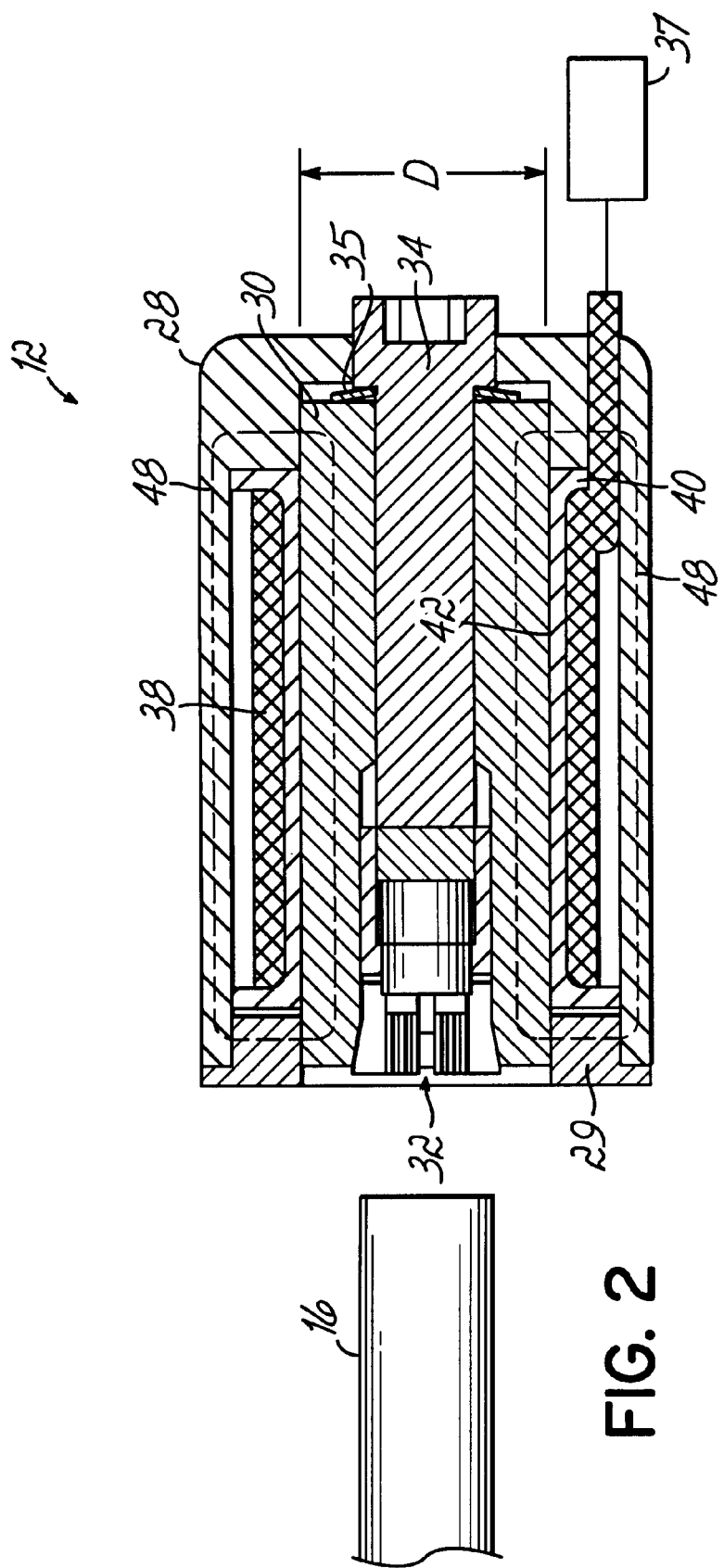
FIG. 2 is a cross-sectional view, along the lines 2—2, illustrating the components of one embodiment of the invention.

FIG. 2 illustrates a cross-section of one embodiment of the present invention. The vibration damping system 12 includes a rotor 30 which is coupled to the steering shaft or input shaft 16. In the embodiment illustrated in FIG. 2, rotor 30 includes a spline section 32 which couples to an appropriately splined receiving section (not shown) of the steering shaft 16. A bolt 34 extending through rotor 30 is used to appropriately couple the rotor 30 to shaft 16. The corresponding spline portions 32 of the rotor 30, and that of the shaft 16, rotationally couple the rotor 30 with shaft 16 so that the rotor will rotate when the shaft rotates. A belleville washer 35 may be used to lock the rotation of the bolt once it has been threaded with shaft 16. In that way, the rotor 30 may be selectively turned when the steering wheel is turned, in accordance with the operation of the invention.

In accordance with one aspect of the invention, when the steering wheel 18 is not being turned in order to turn the vehicle, the rotor 30 resists rotation, but physically and vibrationally couples the shaft 16 and wheel 18 to the casing 28, and to any other stationary member for absorbing any high speed shake and vibration associated with the steering system. Case 28, in accordance with one embodiment of the invention, is formed of a material, such as mild steel, which acts as a magnetically containing, or magnetically soft case to complete the path for the magnetic flux through rotor 30, in accordance with principles of the invention. Case 28 includes a cap 29 at an end thereof opposite the head of bolt 34 to close the case 28 and secure the elements of the vibration damping system therein.

For operating the vibration damping system 10, a magnetic circuit 37 is utilized to make the rotor operable to selectively engage and disengage a clutch surface and thereby vibrationally couple and uncouple shaft 16 from the vibrational absorption characteristics of the damping system 12. Specifically, in one embodiment of the invention, the magnetic circuit includes a coil 38 which is wrapped or wound around the rotor. A stator element 40, made of a non-magnetic material, is positioned around rotor 30 between the coil 38 and the rotor. The stator 40 includes a clutch surface 42 which the rotor 30 selectively engages and disengages, according to the operation of the vibration damping system.

More specifically, when the vibration damping system 12 is engaged (i.e., the steering wheel is not turned), the rotor is operable to engage the clutch surface 42 and thereby vibrationally couple the steering shaft to the case 28 and any other attached structure to absorb vibrations in the shaft and steering wheel. The rotor is further operable, when a magnetic flux is generated therein, to disengage the clutch surface 42 so that the steering shaft can more freely rotate to allow the wheels of the vehicle to turn upon input to the steering wheel 18 by a driver. When no magnetic flux is generated, and no magnetic field is present within the rotor, the rotor 30 forms an interference fit with stator 40 and the clutch surface 42 to transfer vibrations through the system 12.

In accordance with one aspect of the present invention, rotor 30 is formed of a magnetostrictive material. In the embodiment illustrated in the drawings, the rotor is generally cylindrically shaped. Magnetostrictive material is affected by the generation of a magnetic flux or magnetic field within the material. The magnetostrictive material, in the presence of a magnetic flux, changes its dimensions and its shape, to a certain extent. Therefore, upon the generation of a magnetic flux in the rotor, the rotor is dimensionally modified by the magnetic flux. In the case of the cylindrical rotor, the rotor diameter, indicated by "D", decreases, while its length increases. The decreased diameter "D" of rotor 30 causes the rotor to generally disengage the clutch surface 42 so that the rotor 30 and shaft 16 may be rotated more freely. This, in turn, generally uncouples shaft 16 from the vibration damping system, at least in the vibrational sense. Shaft 16 still remains mechanically coupled to rotor 30, which simply rotates more freely within the case 28 and around surface 42. That is, there is no longer an interference fit between rotor 30 and surface 42.

In one embodiment, the magnetic circuit 37, which includes coil 38, receives an input on line 44 from a sensing device 46 which is operationally coupled to the steering wheel 18. Sensing device 46 may be any suitable device which indicates that the steering wheel 18 and/or shaft 16 is being turned or rotated by the driver, and which generates an input on line 44. The input from the sensing device causes magnetic circuit 37 to generate a current within coil 38, and thus generate a magnetic flux within the rotor 30. The path of the magnetic flux is illustrated by a line 48, and the rigid case 28 is operable, as discussed above, for containing the magnetic flux in an efficient manner proximate the rotor 30.

The rotor 30 sufficiently disengages the clutch surface 42 to allow generally free rotation. That is, when the coil is energized and a magnetic flux is generated, the press or interference fit between the rotor 30 and clutch surface 42 is reduced or eliminated so that the rotor, steering wheel and shaft 16 may rotate more freely. The free rotation of the rotor 30 and shaft 16 allow rotation of the steering wheel with no undesired side effects, such as excessive effort from the inertial effects of the vibration damping system. When sensor 46 senses that the steering wheel 18 and/or shaft 16 are no longer being turned, the input signal on line 44 or lack thereof, triggers magnetic circuit 37 to eliminate the current through coil 38, and thereby reduce and eliminate the magnetic flux within the rotor 30. The rotor then returns to a generally non-modified dimensional state (i.e. increased diameter of the cylindrical rotor) to thereby frictionally re-engage clutching surface 42 to form the desired press fit and thereby absorb high speed shake and vibration to be transferred through case 28 to a suitable stationary member, such as member 13 which is coupled to the damping system. Stationary member 13 may be another part of the steering system 10, or part of the vehicle, as discussed above.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A vehicle steering system comprising:
   a steering wheel;
   a steering shaft coupled between the steering wheel and wheels of the vehicle, the shaft operable for rotating when the steering wheel is turned to thereby turn the vehicle wheels;
   a vibration damping system for absorbing vibrations in the steering wheel and shaft, the vibration damping system comprising:
      a rotor coupled to the steering shaft to rotate with the shaft;
      a case surrounding the rotor and a clutch surface proximate the rotor;
      a magnetic circuit for generating a magnetic flux in the rotor;
      the rotor operable to engage the clutch surface and thereby vibrationally couple the steering shaft to the case to absorb vibrations in the shaft, the rotor further operable, when a magnetic flux is generated therein, to disengage the clutch surface so that the steering shaft may more freely rotate.

2. The vehicle steering system of claim 1 wherein the rotor is dimensionally modified when a magnetic flux is generated therein.

3. The vehicle steering system of claim 2 wherein the rotor is generally cylindrical and the cylindrical diameter of the rotor decreases when a magnetic flux is generated therein.

4. The vehicle steering system of claim 2 wherein the rotor returns to a generally non-modified dimensional state when the magnetic flux is no longer generated therein.

5. The vehicle steering system of claim 2 wherein said rotor is formed of a magnetostrictive material.

6. The vehicle steering system of claim 1 wherein said magnetic circuit includes a coil wrapped around the rotor for generating a magnetic flux therein.

7. The vehicle steering system of claim 1 wherein the case is operable for containing magnetic flux proximate to the rotor.

8. The vehicle steering system of claim 1 wherein the clutch surface is on a non-magnetic stator which is engaged by the rotor.

9. The vehicle steering system of claim 1 further comprising a sensor to detect turning of the steering wheel, the sensor, upon such detection, providing an input to the magnetic circuit to cause the magnetic circuit to generate a magnetic flux.

10. The vehicle steering system of claim 1 further comprising a rack and pinion system coupled between the steering wheel and vehicle wheels.

11. A vibration damping system for use in a vehicle steering system which includes a steering wheel and a steering shaft coupled between the steering wheel and wheels of the vehicle, the damping system comprising:
    a rotor adapted to be coupled to a steering shaft to rotate with the shaft;
    a case surrounding the rotor and a clutch surface proximate the rotor;
    a magnetic circuit for generating a magnetic flux in the rotor;
    the rotor operable to engage the clutch surface and thereby vibrationally couple the steering shaft to the case to absorb vibrations in the shaft, the rotor further operable, when a magnetic flux is generated therein, to disengage the clutch surface so that the steering shaft may more freely rotate.

12. The vibration damping system of claim 11 wherein the rotor is dimensionally modified when a magnetic flux is generated therein.

13. The vibration damping system of claim 12 wherein the rotor is generally cylindrical and the cylindrical diameter of the rotor decreases when a magnetic flux is generated therein.

14. The vibration damping system of claim 12 wherein the rotor returns to a generally non-modified dimensional state when the magnetic flux is no longer generated therein.

15. The vibration damping system of claim 12 wherein said rotor is formed of a magnetostrictive material.

16. The vibration damping system of claim 11 wherein said magnetic circuit includes a coil wrapped around the rotor for generating a magnetic flux therein.

17. The vibration damping system of claim 11 wherein the case is operable for containing magnetic flux proximate to the rotor.

18. The vibration damping system of claim 11 wherein the clutch surface is on a non-magnetic stator which is engaged by the rotor.

19. The vibration damping system of claim 11 further comprising a sensor operable to detect turning of the steering wheel, the sensor, upon such detection, providing an input to the magnetic circuit to cause the magnetic circuit to generate a magnetic flux.

20. The vibration damping system of claim 11 further comprising a rack and pinion system coupled between the steering wheel and vehicle wheels.

21. A method for damping the vibration within a vehicle steering system which includes a steering wheel and a steering shaft coupled between the steering wheel and wheels of the vehicle, the method comprising:
    coupling a rotor to the steering shaft to rotate with the shaft;
    positioning a case and a clutch surface proximate the rotor;
    engaging the clutch surface with the rotor to thereby vibrationally couple the steering shaft to the case to absorb vibrations in the shaft, and selectively generating a magnetic flux in the rotor so that it disengages the clutch surface so that the steering shaft may more freely rotate in the case.

22. The method of claim 21 further comprising dimensionally modifying the rotor by generating the magnetic flux therein.

23. The method of claim 22 wherein the rotor is generally cylindrical and the dimensional modification includes decreasing the diameter of the rotor.

24. The method of claim 22 further comprising generally eliminating the magnetic flux and returning the rotor shape to a generally non-modified dimensional state.

25. The method of claim 22 wherein said rotor is formed of a magnetostrictive material.

26. The method of claim 21 further comprising generating the magnetic flux with a coil wrapped around the rotor.

27. The method of claim 21 further comprising containing magnetic flux proximate to the rotor with the case.

28. The method of claim 21 wherein the clutch surface includes a non-magnetic stator which is engaged by the rotor.

29. The method of claim 21 further comprising sensing the turning of the steering wheel and, upon such detection, generating a magnetic flux in the rotor so that it disengages the clutch surface so that the steering shaft may more freely rotate.

* * * * *